Dec. 5, 1939.         H. F. MARANVILLE         2,182,176
APPARATUS FOR FORMING PNEUMATIC TIRE CASINGS
Filed June 17, 1935
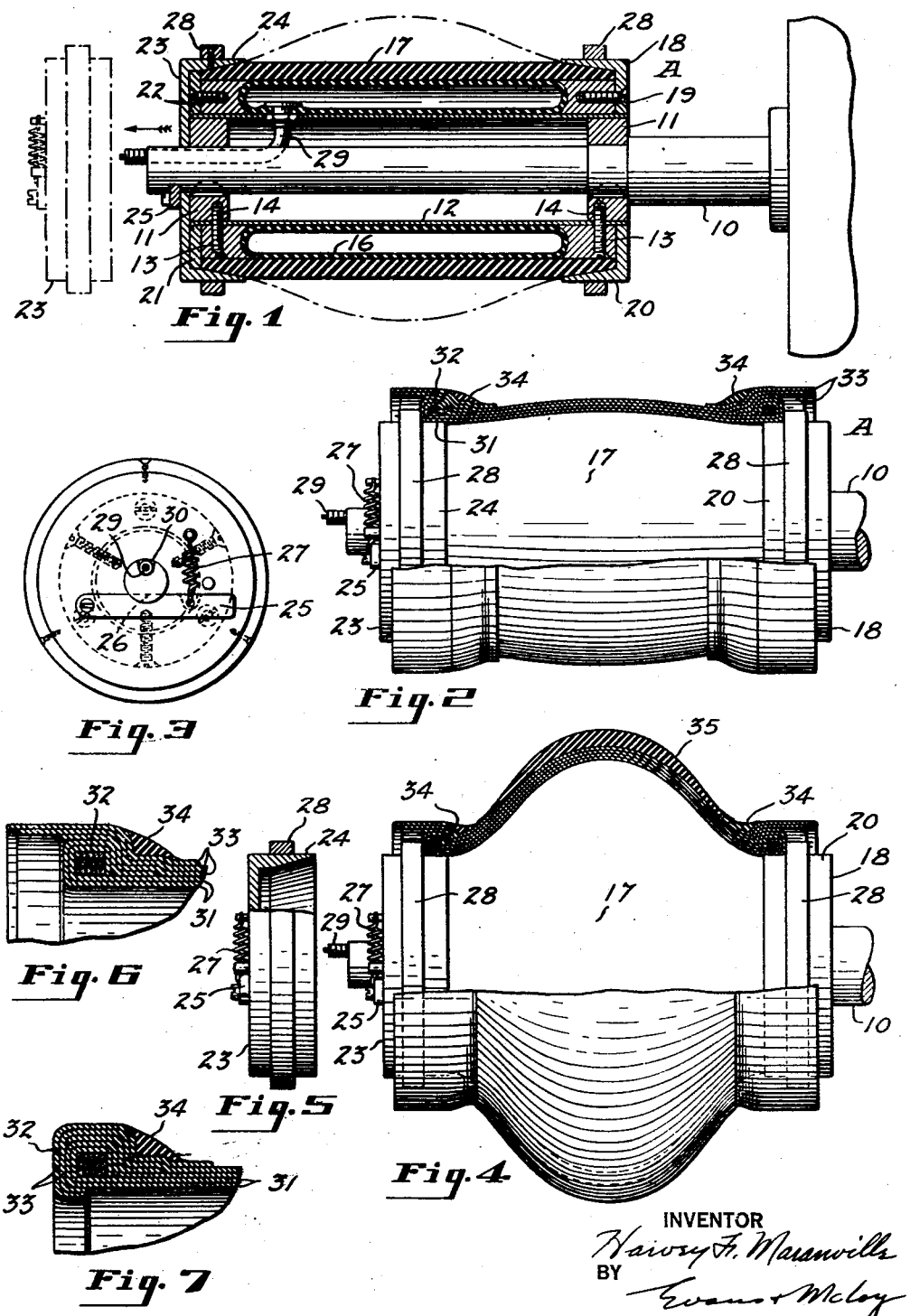
INVENTOR
Harvey F. Maranville
BY
Evans & McCoy
ATTORNEYS Patented Dec. 5, 1939

2,182,176

UNITED STATES PATENT OFFICE 2,182,176

APPARATUS FOR FORMING PNEUMATIC TIRE CASINGS

Harvey F. Maranville, Akron, Ohio, assignor to The General Tire & Rubber Company, Akron, Ohio, a corporation of Ohio Application June 17, 1935, Serial No. 26,929

8 Claims. (Cl. 154—9)

This invention relates to apparatus for forming pneumatic tire casings.

One of the objects of the present invention is to provide a new and improved apparatus for forming pneumatic tire casings by means of which tire casings may be quickly and easily formed in an economical manner.

Another object is to provide apparatus for forming pneumatic tire casings, by means of which the carcass may be first formed to band-like cylindrical shape and then increased in diameter in the central portion intermediate the beads, the rubber tread being applied while the central portion is held to its increased diameter so that upon removal of the diameter-increasing pressure, the tread will hold the casing in a shape for the insertion of a vulcanizing air bag.

Another object is to provide a new and improved drum for forming pneumatic tire casings by the band method.

With the above and other objects in view, the present invention consists in certain features of construction and combinations of parts, and procedure to be hereinafter described with reference to the accompanying drawing and then claimed.

In the drawing,

Figure 1 is a longitudinal section through the tire building drum, one of the heads in its removed position being shown in broken outline;

Fig. 2 is a side elevation of the drum, the tire carcass, partially in section, being shown thereon;

Fig. 3 is an end elevation of the drum;

Fig. 4 is a view similar to Fig. 2, showing the drum extended, and the tire tread in position on the carcass;

Fig. 5 is a side elevation, partially in section, of the removable head of the drum;

Fig. 6 is an enlarged fragmentary sectional view of the bead portion of the tire casing, showing some of the fabric strips extended; and Fig. 7 is a view similar to Fig. 6 but showing the extended fabric strips folded into position about the bead portion.

Referring to the accompanying drawing in which like numerals refer to like parts throughout the several views, the building drum A is mounted on a rotatable shaft 10 and comprises a pair of annular collars 11 keyed to the shaft 10 which carry a tubular member 12 and a pair of annular rings 13 mounted on the ends of the tubular member 12, the rings 13 being held in place by countersunk screws 14 which extend through the rings 13 and member 12 and are threaded into the collars 11. The ends of the rings 13 which face each other are of arcuate shape in cross-section and form abutments for an annular expandable tube 16 which surrounds the tubular member 12. Surrounding the tube 16 and rings 13 is a sleeve 17 of resilient material such as rubber, or any other suitable deformable material. The ends of the sleeve are tapered or conical as shown in Fig. 1, the end at the right, as viewed in Fig. 1, being clamped against the ring 13 by a cup-shaped member 18 secured to the ring 13 by one or more screws 19, the member 18 having a flange 20 the inner surface of which is tapered for engagement with the adjacent tapered end of the sleeve 17.

The opposite end of the sleeve 17 abuts against a plate 21 secured to the ring 13 by one or more screws 22, and the tapered end of the sleeve 17 is normally clamped against the ring 13 by a cup-shaped member 23 similar to the member 18 also having a flange 24 the inner face of which is tapered as shown in Fig. 1 to engage with and clamp the tapered end of the sleeve against the ring 13.

The member 23, however, is removable and is slidably mounted on the free end of the shaft 10 and held against outward movement by a latch bar 25 pivoted thereto and which engages with a recess 26 formed in the shaft 10, a spring 27 being provided to normally hold the latch bar 25 within the recess 26.

Also mounted on the flange of each of the members 18 and 23 is an annular bead engaging ring 28.

The inflatable tube 16 is provided with an angle valve stem 29 which projects through an opening 30 in the removable member 23.

In the process of building a tire casing, the tube 16 is inflated sufficiently to expand the sleeve a slight amount to give it a slightly convex appearance in a lengthwise direction, as shown in Fig. 2. The drum A is then rotated and the first and second layers 31 of cord fabric are applied in the usual manner with the side edges abutting and extending radially adjacent the abutment rings 28.

The tire beads 32 are initially in strip form and are wound during rotation of the drum around the ply fabric sides adjacent the rings 28 and on the flanges of the cup-like members 18 and 23, after which the radially projecting side edges of the fabric plies 31 are folded over the beads 32 and stitched.

The outer layers or plies 33 are then applied in the usual manner but with their side edges projecting over and beyond the rings 28 as shown in Figs. 2 and 6.

After this strips 34 of rubber, such as sidewall stock, are applied on the outermost material 33 adjacent the bead portions of the carcass.

The tube 16 is next further inflated to expand the sleeve 17 intermediate its ends. Since the sleeve ends are held in place by the flanges of the cup-like members 18 and 23 and since the innermost plies 31 of the fabric are anchored by the inextensible beads 32, the portion of the carcass intermediate the beads 32 is circumferentially enlarged by the inflation of the tube 16 from a minimum adjacent the beads to a maximum at the median plane, somewhat as shown in Fig. 4, the pantograph action of the cords of the adjacent plies of fabric which are crossed as in the usual cord tire construction, also permitting this expansion of the central portion of the tire carcass.

While the carcass is in its expanded form, the rubber tread body 35 is applied and properly stitched, the edges thereof being abutted or overlapped with the edges of the rubber strips 34.

The expansion of the carcass and the application of the tread 35 to the carcass while it is expanded causes the fabric plies to take a set and when the tube 16 is deflated and the sleeve 17 returns to its normal cylindrical shape (shown in Figure 1), the casing will remain substantially in its expanded form.

After deflation of the tube 16, the cup-like member 23, is removed by first disengaging the latch bar 25 from the recess and then sliding the same from the free end of the shaft 10 in the direction shown by the arrow in Figure 1.

The tire casing is then slid axially over and from the drum, and the extending portions of the fabric plies 33 are folded around the bead portions as shown in Figure 7 and stitched.

As before stated, the tire casing, by reason of the application of the tread when the carcass is expanded, remains in the approximate shape shown in Figure 4, with the result that it is not necessary to use any means such as for example, a vacuum box, to approximately shape the tire casing before it is placed in a heater for vulcanization.

By the use of the present invention, the air bag used in vulcanization of the casing, can be inserted directly as the casing is removed from the building drum, without the performance of intermediate forming steps, and the casing may then be placed in a heater for vulcanization. This results in a material saving in time and expense, which is a material advantage in the manufacture of pneumatic tires in quantity production.

Although a single embodiment of the invention has been herein shown and described it will be understood that numerous details of the construction shown may be altered or omitted without departing from the spirit of this invention as defined in the following claims.

What I claim is:

1. A tire building drum comprising a rotatable supporting member, a cylindrical sleeve of deformable material surrounding said supporting member in spaced relation, spaced means supporting the ends of said sleeve on said member, inextensible means surrounding the end portions of said sleeve, and an inflatable tube in the space between said supporting member and sleeve for circumferentially expanding said sleeve intermediate said inextensible means, each of said inextensible means having an annular tire bead abutment flange extending radially therefrom.

2. A tire building drum comprising a rotatable supporting member, a cylindrical sleeve of deformable material surrounding said supporting member in spaced relation, spaced means supporting the ends of said sleeve on said member, inextensible means surrounding the end portions of said sleeve, and an inflatable tube in the space between said supporting member and sleeve for circumferentially expanding said sleeve intermediate said inextensible means, each of said inextensible means having an annular tire bead abutment flange extending radially therefrom, one of said inextensible means being removable from said sleeve to permit a tire carcass formed on said sleeve to be axially slipped therefrom.

3. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, and an inflatable tube in the space defined by said cylindrical member, spaced members and sleeve for circumferentially expanding said sleeve intermediate said annular members.

4. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, and an inflatable tube in the space defined by said cylindrical member, spaced members and sleeve for circumferentially expanding said sleeve intermediate said annular members, one of said annular members being removable from said sleeve to permit a tire carcass formed on said sleeve to be axially slipped therefrom.

5. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, an inflatable tube in the space defined by said cylindrical member, spaced members and sleeve for circumferentially expanding said sleeve intermediate said annular members, and holding means for holding each of said annular members against axial movement relative to said sleeve.

6. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, an inflatable tube in the space defined by said cylindrical member, spaced members and sleeve for circumferentially expanding said sleeve intermediate said annular members, one of said holding means being detachably engageable with said shaft to permit removal of the associated annular member from said sleeve, whereby to permit a tire carcass formed on said sleeve to be axially slipped therefrom.

7. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, an inflatable tube in the space defined by said cylindrical member, spaced members and sleeve for circumferentially expanding said sleeve intermediate said annular members, one of said annular clamping members having latched engagement with said shaft to permit removal of the associated annular member from said sleeve, whereby to permit a tire carcass formed on said sleeve to be axially slipped therefrom.

8. In a tire building drum, a rotatable shaft, a cylindrical member fixed to said shaft, spaced members extending circumferentially around said cylindrical member in fixed relation, a sleeve of deformable material having its ends supported on said spaced members, inextensible annular members clamping the ends of said sleeve circumferentially against said spaced members, and an inflatable tube in the space defined by said cylindrical member, spaced members and sleeve for circumferentially expanding said sleeve intermediate said annular members, each of said annular members having a circumferentially extending tire bead abutment thereon.

HARVEY F. MARANVILLE.